United States Patent [19]

Wallace

[11] Patent Number: 4,898,204
[45] Date of Patent: Feb. 6, 1990

[54] LOW PRESSURE GAS REGULATOR
[75] Inventor: Elmer E. Wallace, Fort Wayne, Ind.
[73] Assignee: SCP, Inc., Auburn, Ind.
[21] Appl. No.: 295,501
[22] Filed: Jan. 11, 1989
[51] Int. Cl.$^4$ ............................................. G05D 16/06
[52] U.S. Cl. ................................. 137/505.41; 251/358
[58] Field of Search ........................... 137/505.41, 375; 251/358

[56] References Cited

U.S. PATENT DOCUMENTS

| | | | |
|---|---|---|---|
| 172,877 | 2/1976 | Hays | 137/505.41 |
| 1,946,188 | 2/1934 | Birch | 137/505.11 X |
| 2,250,813 | 7/1941 | Rea | 251/358 |
| 2,979,067 | 4/1961 | Kern et al. | 137/505.41 X |
| 3,228,731 | 1/1966 | Valentine | 137/102 X |
| 3,747,629 | 7/1973 | Bauman | |
| 3,935,626 | 2/1976 | Genbauff | |
| 4,074,694 | 2/1978 | Lee | 137/505.41 |
| 4,630,637 | 12/1986 | Furst et al. | 137/375 X |

*Primary Examiner*—Stephen M. Hepperle
*Attorney, Agent, or Firm*—Hill, Van Santen, Steadman & Simpson

[57] ABSTRACT

A low pressure gas regulator which includes a ball valve which is surrounded by a soft rubber seat which has two different thicknesses with one of the thicknesses being greater in the region which contacts the valve seat and being thinner on the portion of the ball valve which does not engage the valve seat. The ball valve is connected to a valve stem which is connected to a moveable diaphragm which the controls the position of the valve in response to pressure variations.

3 Claims, 1 Drawing Sheet

LOW PRESSURE GAS REGULATOR

BACKGROUND OF THE INVENTION

1. Field of the Invention

This invention relates in general to pressure regulators and, in particular, to a soft rubber silicon seat which surrounds a ball valve.

2. Description of the Prior Art

U. S. Pat. Nos. 3,747,629, 3,935,626 and 4,074,694 disclose pressure regulators which spring-loaded diaphragms for moving a valve stem and a valve seat for controlling pressure.

SUMMARY OF THE INVENTION

The present invention relates to a novel pressure regulator assembly which includes a housing in which a diaphragm is mounted that is attached to a valve stem upon which is mounted a ball valve which moves relative to a valve seat. A soft rubber seat surrounds the ball valve and has two thicknesses with the thicker thickness positioned so as to engage the valve seat so as to effectively shut off and seal the valve.

The pressure regulator of the invention provides control of circle P pilot regulator gas as, for example, 150 BTU/HR and will also tolerate aborted upstream pressures of 60 PSI without damage to the device. In a specific embodiment at 60 PSI the regulator shuts off or locks up and passes less than 0.1 cubic foot/HR through the valve seat.

The soft rubber seat provides a positive seal.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
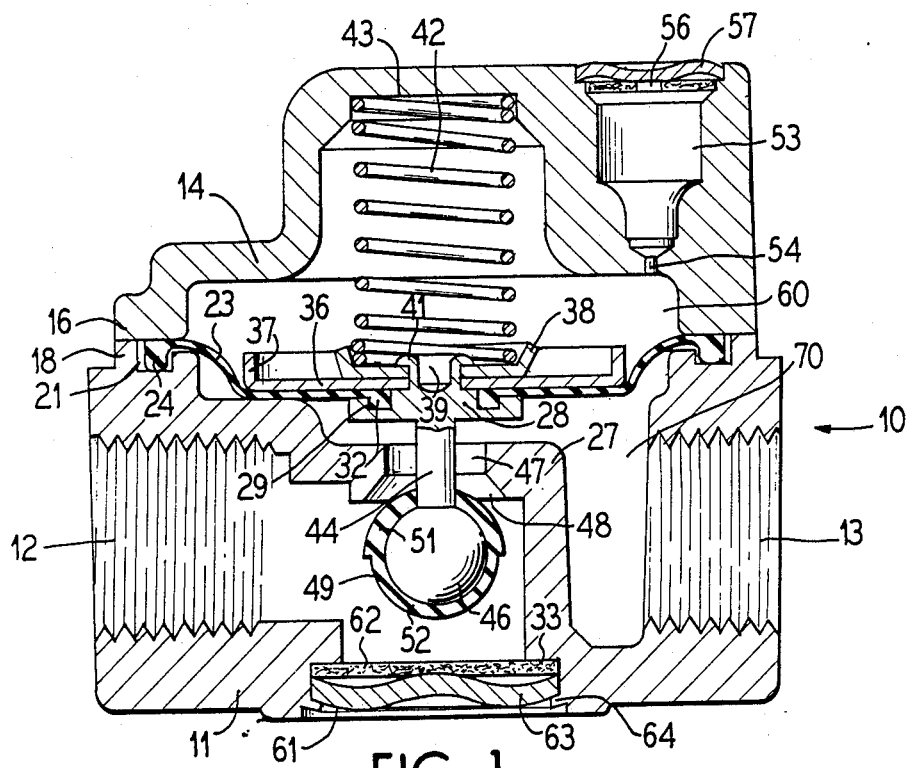
FIG. 1 is a sectional view through the regulator of the invention showing the valve in the opened position.
Figure 2:
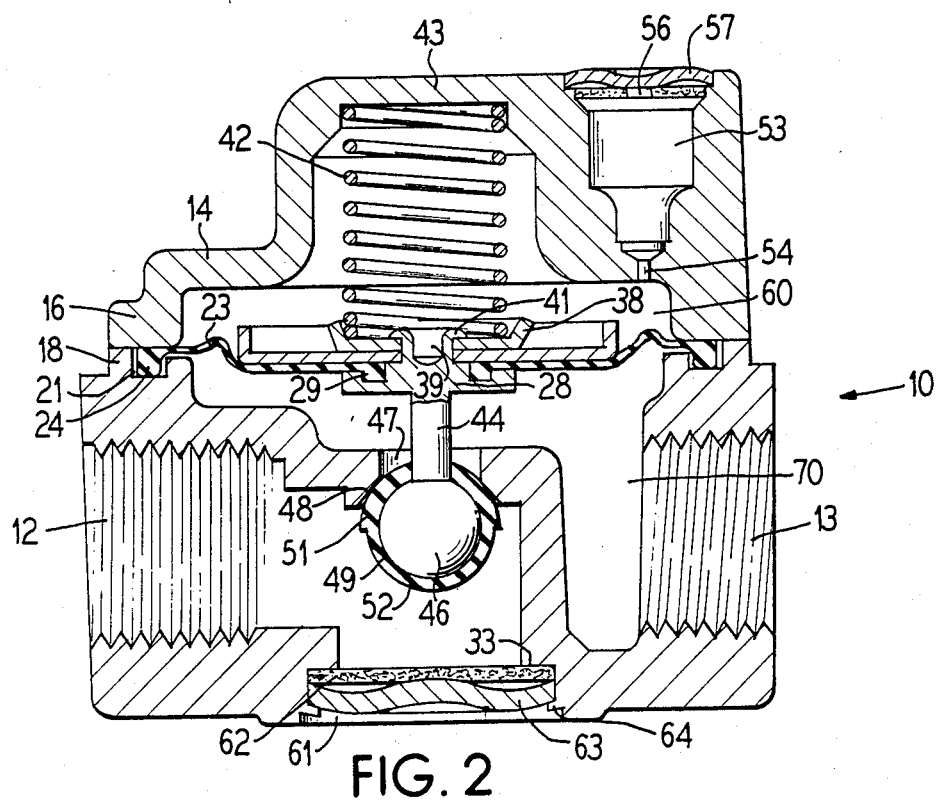
FIG. 2 is a sectional view through the regulator of the invention showing the valve in the closed position.

FIGS. 1 and 2 show a low pressure gas regulator 10 according to the present invention which has a housing 11 with an input opening 12 which is threaded so as to receive a mating input conduit and an output opening 13 which is threaded to receive an output conduit. The housing 11 has a top cover member 14 which has a lower outer peripheral portion 16 which rests on an extending portion 18 of the body member 11. The upper portion 18 at the body member 11 is formed with an annular groove 21 in which an outer portion 24 of a diaphragm 23 is received. A backing washer 36 is mounted on the upper surface of the diaphragm 23 and a washer 38 is mounted above the washer 36. An upper portion 39 of a valve stem 44 passes through the diaphragm 23 and the washers 36 and 38 and has an outwardly bent portion 41 so as to lock the valve stem 44 to the washers 36, 38 and the diaphragm 23. An extending portion 28 extends outwardly from the valve stem 44 on the lower side of the diaphragm 23 and the diaphragm 23 has an inner lip 32 which is received in a groove 29 of the member 28. A partition 27 is formed in the body member 11 and is formed with an opening 47 and a valve seat 48 through which the valve stem 44 extends. Valve stem 44 carries a metal ball valve 46 upon which is mounted a soft rubber seat 49. The soft rubber seat 49 has a thinner portion 52 which extends around the lower portion of the ball valve 36 and a thicker portion 51 which mates with the valve seat 48.

An opening 61 is formed in a lower portion of the body member 11 and a gasket 62 rests against a shoulder 33 and a plug 63 is received in the opening 61 and is held by upset portion 64 so as to provide a seal for the regulator.

An opening 54 communicates with the opening 56 above an opening 53 and a welch plug 57 is mounted over the opening 56 of the passage 53 to provide protection for orifice hole 54 so diaphragm 23 can move up and down and breathes from atmosphere due to pressure changes to inlet (12).

A spring 42 engages the washer 38 and has its opposite end against the top portion 43 of the cover member 14.

Spring (42) is a precision spring designed to provide a certain outlet pressure through chamber (70). As pressure in chamber 12 fluctuates up and down, valve (46) moves up and down accordingly to maintain the required outlet pressure in chamber (70).

In FIG. 1, the pressure in the chamber 70 below the diaphragm 23 is lower than the pressure in the chamber 60 above the diaphragm which is normally the atmospheric or ambient pressure and the higher pressure in the chamber 60 has caused the diaphragm 23 to move downwardly against the spring tension of the spring 42 so as to open the valve so that the ball valve 46 and the soft rubber seat 49 disengages from the valve seat 48 so as to allow gas to flow from inlet 12 into the chamber 70 and out the outlet passage 13. FIG. 2 illustrates the condition where the pressure in chamber 70 is high enough that the diaphragm 23 moves up thus causing the ball valve 46 and the soft rubber seat 49 to engage the valve seat 48 so as to close the valve. The thicker portion 51 of the soft rubber seat 49 engages the valve seat as shown.

A design feature of the valve calls for valve (46) to be able to pass through valve seat orifice 47 for assembly purposes. Thus, valve 46 has a smaller diameter than valve seat orifice 47.

In operation, the valve 46 can alternately open and close in response to the pressure differential in the chambers 60 and 70. Also, due to the use of the soft rubber seat 49 which has the thicker portion 51 the valve 46 will provide a positive seal.

Although the invention has been described with respect to preferred embodiments, it is not to be so limited as changes and modifications may be made therein which are within the full intended scope as shown by the appended claims.

I claim as my invention:

1. A low pressure gas regulator comprising a body member, an inlet opening formed in said body member, an outlet opening formed in said body member, a partition in said body member which separates said inlet and outlet opening and formed with an opening which is surrounded with a valve seat, a moveable diaphragm mounted in said body member so as to have atmospheric pressure on one side thereof and the pressure of the outlet opening on the ohter side, a valve stem connected to said diaphragm and extending through said opening in said partition, a ball valve mounted on said valve stem in said inlet opening, and a relatively thick soft resilient cover mounted over said ball valve and engageable with said valve seat, and wherein said cover has a first thicker portion which engages said valve seat and a second portion which does not engage said valve seat which is thinner than said first portion.

2. A low pressure gas regulator according to claim 1 wherein said cover is formed of soft silicon rubber.

3. A low pressure gas regulator according to claim 1 including a spring which biases said diaphragm in a first direction.

* * * * *